(12) United States Patent
Kook et al.

(10) Patent No.: US 8,462,307 B2
(45) Date of Patent: Jun. 11, 2013

(54) LIQUID CRYSTAL DISPLAY DEVICE HAVING GATE OR DATA PAD PORTIONS ARRANGED IN A ZIGZAG OR AN OBLIQUE LINE FORMAT

(75) Inventors: Yun-Ho Kook, Seoul (KR); Soon-Sung Yoo, Gyeonggi-Do (KR); Youn-Gyoung Chang, Gyeonggi-do (KR); Seung-Hee Nam, Gyeonggi-Do (KR); Nam-Kook Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 358 days.

(21) Appl. No.: 13/007,336

(22) Filed: Jan. 14, 2011

(65) Prior Publication Data

US 2011/0116028 A1 May 19, 2011

Related U.S. Application Data

(62) Division of application No. 12/333,033, filed on Dec. 11, 2008, now Pat. No. 7,884,913.

(30) Foreign Application Priority Data

Apr. 23, 2008 (KR) ........................ 10-2008-0037919

(51) Int. Cl.
*G02F 1/1345* (2006.01)
(52) U.S. Cl.
USPC ............................. 349/149; 349/152; 345/104

(58) Field of Classification Search
USPC .................................... 354/104; 349/149, 152
See application file for complete search history.

(56) References Cited

U.S. PATENT DOCUMENTS

| | | | |
|---|---|---|---|
| 6,771,348 B2 | 8/2004 | Oh et al. | |
| 7,300,830 B2 | 11/2007 | Yoo et al. | |
| 7,733,456 B2 * | 6/2010 | Lee et al. | 349/152 |
| 2004/0196416 A1 | 10/2004 | Cho et al. | |
| 2004/0257509 A1 * | 12/2004 | Lee et al. | 349/139 |
| 2008/0157364 A1 * | 7/2008 | Yang et al. | 257/741 |

FOREIGN PATENT DOCUMENTS

| | | |
|---|---|---|
| KR | 10-2002-0088450 A | 11/2002 |
| KR | 10-2005-0005180 A | 1/2005 |
| KR | 10-2006-0088683 A | 8/2006 |

* cited by examiner

*Primary Examiner* — Huyen Ngo
(74) *Attorney, Agent, or Firm* — Birch, Stewart, Kolasch & Birch, LLP

(57) ABSTRACT

A LCD device and its fabrication method as discussed. According to an embodiment, the LCD device includes a plurality of gate lines and data lines arranged on a substrate to define a plurality of unit pixels; thin film transistors (TFTs) each formed at an intersecting region of the gate lines and the data lines; a plurality of gate pad portions and data pad portions formed at end portions of the gate lines and the data lines, respectively, at least one of the gate and data pad portions being made up of at least two pad unit portions, each pad unit portion having at least one contact hole such that the contact holes of one of the plurality of gate or data pad portions are arranged in a zigzag or an oblique line format; and pixel electrodes formed at the unit pixels.

11 Claims, 9 Drawing Sheets

LIQUID CRYSTAL DISPLAY DEVICE HAVING GATE OR DATA PAD PORTIONS ARRANGED IN A ZIGZAG OR AN OBLIQUE LINE FORMAT

This application is a Divisional of application Ser. No. 12/333,033, filed on Dec. 11, 2008 now U.S. Pat. No. 7,884,913, which claims priority under 35 U.S.C. §119(a) to Korean Patent Application No. 10-2008-0037919 filed in Republic of Korea on Apr. 23, 2008, the entire contents of which are hereby incorporated by reference in its entirety.

BACKGROUND OF THE INVENTION

1. Field of the Invention

The present invention relates to a Liquid Crystal Display (LCD) device, and more particularly, to a Liquid Crystal Display (LCD) device having contact holes in a zigzag (or oblique line) format on pad portions and/or varying the linewidths of the pad portions.

2. Discussion of the Background Art

A Flat Panel Display (FPD) having a light weight in a thin film shape is actively researched and commercialized for substituting a Cathode Ray Tube (CRT), a conventional display device, as interest and requirements in/for an information display and a portable information medium have increased in the 21st century.

In the FPDs, a Liquid Crystal Display (LCD) device is actively applied to a notebook or a desktop monitor since it implements excellent resolution, color display and definition, as a device for representing images using an optical anisotropy of liquid crystal.

Generally, the LCD device is configured by coupling two substrates on which a plurality of structures including Thin Film Transistors (TFTs) are disposed, to face each other through a series of processes and then sealing them by filling with liquid crystal therebetween. Here, on an array substrate that is a lower substrate between the two substrates, gate lines and data lines intersect with each other in a matrix format and TFT devices each electrically connected to the corresponding pixel electrode are provided in the intersecting region. Also, gate pads and data pads are respectively formed at each end of the gate lines and the data lines.

And, the gate pads and the data pads are connected to an operation circuit. The operation circuit is electrically connected to an external circuit to provide data input signals, and accordingly the data signals are separated from each other according to a control signal of the operation circuit itself and then transferred to each pixel. Here, the operation circuit and the data lines or the gate lines of the LCD device are connected to each other in a Tape Automated Bonding (TAB) method generally. Here, the TAB method refers to a method of mounting a package connected to an operation circuit onto a substrate.

FIG. 1 is a view showing a pad portion (top plan and side views) of a general LCD device.

As shown in FIG. 1, each pad portion connected to each end of the gate lines and data lines includes a pad metallic film 12, an insulation layer 17 and a transparent conductive film ITO (Indium Tin Oxide) 15. The insulation layer 17 may be implemented as a protection film 14 of a single layer or a double film of a gate insulation film 13 and the protection film 14. And, the pad metallic film 12 and the transparent conductive film ITO 15 contact each other at a pad open region (or contact hole) 16.

For example, the pad metallic film 12 formed of Chrome (Cr), for example, and the gate insulation film 13 and the protection film 14 may be formed over the pad metallic film 12. In addition, the pad open region 16 formed by partially etching the insulation film 13 so as to expose a portion of the pad metallic film 12 and the transparent conductive film ITO 15 compressed on the insulation film 13 so as to contact the pad metallic film 12 through the pad open region 16 are formed thereon in sequence. Here, the transparent conductive film ITO 15 is connected to a terminal such as an IC by the TAB method.

Accordingly, the pad portion having a lower pad layer provided with the pad metallic film 12 and an upper pad layer provided with the transparent conductive layer ITO 15 and connected to a TAB IC is provided.

However, due to an environmental regulation, the pad metallic film 12 is conventionally formed of Molybdenum (Mo) as a substitute for Cr. As a result, the pad metallic film 12 is mostly etched when forming the pad open region or contact hole on the pad portion formed of Mo. This causes a side contact between the transparent conductive film ITO 15 and the pad metallic film 12. The side contact means that a contacting area between the transparent conductive film ITO 15 and the pad metallic film 12 is remarkably small. Since a contact resistance of a general pad portion is determined by a portion where the transparent conductive film ITO 15 and the pad metallic film 12 contact each other, if the contact resistance is reduced due to the side contact, the properties of signals transferred to the gate or data pad portion from the TAB IC may be distorted.

In order to address this problem, a method for forming a plurality of pad open regions (contact holes) on one pad portion has been proposed, which will be discussed referring to FIG. 2.

FIG. 2 is a view showing a pad portion (top plan and side views) of a LCD device having a plurality of pad open regions and FIG. 3 is a planar view showing pad portions of a LCD device having multi-holes in a stripe format, in accordance with the related art. The pad portions parallel each other and the contact holes are aligned to each other as shown in FIG. 3.

As shown in FIG. 2, the pad portion includes a pad metallic film 22 formed of Mo on a transparent glass substrate 21 and a gate insulation film 23 formed on the pad metallic film 22. Here, though it is not shown, a gate line and a gate electrode are formed on the glass substrate 21 of a pixel region to be integral with the pad metallic film 22. In addition, a gate insulation film 23 is formed at a front surface of the substrate including the gate line and the gate electrode.

The pad metallic film 22 is formed of Mo in a sputtering manner. And, the gate insulation film 23 is formed of inorganic substance such as Silicon Nitride (SiNx) or Silicon Oxide (SiOx) in a PECVD (Plasma Enhanced Chemical Vapor Deposition) method.

A protection film 24 is formed on the gate insulation film 23 thus to form an insulation layer 27. The protection film 24 is formed of BCB (Benzocyclobutene) having a low permittivity.

Meanwhile, a data line and a source/drain electrode are formed on the gate insulation film 23 of the pixel region thus to form a Thin Film Transistor (TFT) together with the gate electrode, and the protection film 24 is formed at the front surface including the TFT.

By selectively removing the protection film 24 and the gate insulation film 23 of the pad portion, the pad metallic film 22 is partially or selectively etched and a plurality of substrate open regions 26 are formed.

And, a transparent conductive film ITO 25 over the protection film 24 so as to contact the pad metallic film 22 at the substrate open regions 26.

Accordingly, the pad metallic film 22 and the transparent conductive film ITO 25 contact each other through the plurality of substrate open regions 26 at the pad portion. This in turn reduces the contact resistance, which can minimize distortion of a signal being applied at the pad portion.

As another example of the pad portion having the multi-hole structure (open regions 26), substrate open regions 36 may be formed on the same line to be formed in the stripe format as shown in FIG. 3. Here, every pad portion 32 may have three or more substrate open regions 36.

However, in case that a photolithography process is applied to form the multi-holes in the stripe format in the related art, since a high-priced mask is used, a fabrication cost of the pad portions may increase.

In order to address this problem, a method for fabricating a LCD device to which a printing method is applied has been proposed according to the related art, which is discussed referring to FIG. 4.

FIG. 4 is a view partially showing a method for fabricating a LCD device to which a related art roll printing method is applied.

As shown in FIG. 4, when forming contact holes on a pad portion of the LCD device, a PR solution 45 ejected from a coater 30 is absorbed onto a roller 40 formed of polydimethylsiloxane (PDMS) and then the roller 40 is rolled on a cliché, namely, a printing plate 50 having embossed patterns 51 thus to form PR patterns 45a on the roller 40.

Then, the PR patterns 45a formed on the roller 40 are transferred onto a substrate 60 on which a pad metallic film and an insulation film 61 are mounted, and then contact holes (open regions) are formed by an etching process and a photo stripping process using the PR patterns 45a on the substrate 60.

Here, it is assumed that the pad metallic film is formed at the lower portion of the insulation film 61 on the substrate 60.

And, when forming these contact holes e.g., (open regions) on the pad portion, other contact holes are also formed on a protection film of a TFT portion, simultaneously.

However, the roll printing process is not limited to the formation of contact holes but can be broadly applied at a time of forming gate lines including a gate pad metallic film and data lines including a data pad metallic film.

Further, above all, when fabricating the printing plate 50 which is to be used to form the contact holes of the pad portion and the TFT portion formed on an array substrate of a LCD, it is difficult to form the embossed patterns 51 related to the formation of various contact holes, in consideration of a margin for obtaining a depth of the printing plate 50 in a wet etching process.

As a result, when a printing process is applied with using a photoresist, (substituting the photolithography process) in order to form the multi-holes on the pad portion in the stripe format as shown in FIG. 3 according to the related art, it is rather difficult to form these multi-holes on the pad portions.

As an example, FIG. 5A is a view showing a structure of an "ideal" printing plate having embossed patterns in an ideal stripe format, which can be used in the step of forming the multi-holes on the pad portions, and FIG. 5B is a section view showing a cut portion taken along line A-A' in FIG. 5A. And, FIG. 6A is a view showing an example of a structure of an actual printing plate which is often used in the actual step of forming the multi-holes on the pad portions, and FIG. 6B is a section view showing a cut portion taken along line B-B' in FIG. 6A.

In order to allow pads adjacent to each other to have contact holes along the same straight line (same as the photolithography process), the embossed patterns on a printing plate may be entirely formed in the stripe format as shown in FIG. 5A.

More specifically referring to FIGS. 5A and 5B, when performing the wet etching to form the embossed patterns 51 on the substrate 50, the photoresist (PR) coated on the glass substrate 50 is coupled to the glass substrate 50 with a small coupling force. Thus, the photoresist is partially stripped at the time of etching. Accordingly the embossed patterns 51, which are to be used to form the contact holes (e.g., open regions) on pad portions and other portions, are not precisely formed on the glass substrate 50.

To avoid the abovementioned limitation, when forming the embossed patterns on the glass/printing plate 50, as shown in FIG. 5B a mask layer is mounted on an initial glass substrate 50 and a photoresist (PR) formed thereon, the PR is exposed to the light and developed in consideration of the margin of the depth of the printing plate through the photolithography process, and a metallic layer is etched thus to form photoresist patterns 53 and mask patterns 52. Then the PR patterns 53 and mask patterns 52 are used to form the embossed patterns 51 on the plate 50.

Here, the wet etching for forming the embossed patterns 51 on the plate 50 is performed at the lower portion of the mask patterns 52 as shown in FIG. 5B. In the wet etching process, an isotropic etching phenomenon may occur where the embossed patterns 51 are etched in a round shape as the depth becomes greater and simultaneously a width becomes wider, in the wet etching process. Thus, the margin of the depth of the printing plate should be properly obtained.

Regarding this, in the related art, when the etched depth of the printing plate 50 is approximately 40~50 μm, it is capable of obtaining enough margin of the depth of the printing plate. Accordingly, when forming the mask patterns 52 for forming the embossed patterns 51 having 12 μm of each width in up and down and right and left, it is designed by additionally calculating 40 μm for each width in up and down and right and left.

However, it is assumed that a pitch between the pads (gate pads or data pads) is 60 μm and a contact hole having approximately 12 μm in width is formed on the pad portion having 26 μm in width according to the design of the data pad portion on the TFT array substrate. Then, if the printing plate has the margin of approximately 40 μm of depth as abovementioned, the embossed patterns which are to be used to form contact holes or open regions would not be formed properly. For example, as shown in FIGS. 6A and 6B, improper and undesirable embossed patterns 51a may be formed on a printing plate 50a using PR patterns 53a and mask patterns 52a.

Hereafter, a problem or limitation generated when fabricating a TFT array substrate using the printing plate having the structure as shown in FIGS. 6A and 6B, will be discussed referring to FIGS. 7A-7C.

FIGS. 7A to 7C are views showing processes for fabricating a TFT array substrate using a printing plate 50a having the embossed patterns 51a as shown in FIGS. 6A and 6B according to a relate art.

As shown in FIG. 7A, when fabricating the TFT array substrate of a LCD device, the PR solution is not entirely or properly coated over the periphery of the pad portions of the TFT array substrate by the embossed patterns 51a of the printing plate after forming a protection film 73 due to the defects of the embossed patterns 51a discussed above. Accordingly a gate insulation film 71 formed on a substrate 70 and at both lower portions of a pad metallic film 72 formed of Mo is etched as well as the protection film 73, i.e., under cut phenomenon occurs, when performing a dry etching for forming the contact holes as shown in FIG. 7B.

As a result, when performing a rubbing process for the TFT array substrate, protruded portions at both sides of the pad metallic film 72 come off and then act as foreign substances that interfere with the other substrates/substances in the processes, which is a problem.

SUMMARY OF THE INVENTION

Therefore, a first object of the present invention is to provide a printing plate in which disposition of embossed patterns is changed so as to form contact holes by precisely transferring PR patterns on a pad metallic film formed on a TFT array substrate at the time of a roll printing process.

A second object of the present invention is to provide a Liquid Crystal Display (LCD) device having contact holes in a zigzag (or oblique line) format by having two or more pad unit portions as one set (or one pad portion) by using a printing plate.

A third object of the present invention is to provide a LCD device in which the linewidths of the peripheral regions of contact holes and the peripheral regions of non-contact holes in each pad unit portion are different from each other, where the contact holes on two or more pad unit portions are arranged in a zigzag (or oblique line) format or pattern, in consideration of a minute mis-alignment which may be generated at the time of a roll printing process, when applying the printing plate formed according to the first object.

To achieve these and other advantages and in accordance with the purpose of the present invention, as embodied and broadly described herein, in accordance with an aspect of the present invention, there is provided a LCD device comprising a plurality of gate lines and data lines intersecting with each other on a substrate so as to define a unit pixel, a TFT formed at the intersecting region of each of the gate lines and each of the data lines, a plurality of gate pad portions and/or data pad portions formed at end portions of the corresponding gate lines and/or the data lines, contact holes formed on the gate and/or data pad portions and in a zigzag or an oblique line format by having two or more pad unit portions as one of the gate or pad portion, and a pixel electrode formed at each unit pixel of the substrate.

In accordance with another aspect of the present invention, there is provided a LCD device comprising a plurality of gate lines and data lines intersecting with each other on a substrate so as to define unit pixels, a TFT formed at each intersecting region of the gate lines and data lines, a plurality of gate pad portions and/or data pad portions formed at end portions of the gate lines and/or the data lines, wherein each of the gate and/or data pad portions has different or varying linewidths by being divided into a first region and a second region, contact holes formed in a zigzag format on the pad portions, and a pixel electrode formed at each unit pixel of the substrate.

In accordance with another aspect of the present invention, there is provided a liquid crystal display (LCD) device comprising: a plurality of gate lines and data lines arranged on a substrate to define a plurality of unit pixels; thin film transistors (TFTs) each formed at an intersecting region of the gate lines and the data lines; a plurality of gate pad portions and data pad portions formed at end portions of the gate lines and the data lines, respectively, at least one of the gate and data pad portions being made up of at least two pad unit portions, each pad unit portion having at least one contact hole such that the contact holes of one of the plurality of gate or data pad portions are arranged in a zigzag or an oblique line format; and pixel electrodes formed at the unit pixels.

In accordance with another aspect of the present invention, there is provided a method of fabricating a liquid crystal display (LCD) device, the method comprising: forming a plurality of gate lines and data lines arranged on a substrate to define a plurality of unit pixels; forming thin film transistors (TFTs) each at an intersecting region of the gate lines and the data lines; forming a plurality of gate pad portions and data pad portions at end portions of the gate lines and the data lines, respectively, at least one of the plurality of gate and data pad portions including contact holes, wherein the step of forming the plurality of gate and data pad portions includes: providing a printing plate having a predetermined pattern, the predetermined pattern being a zigzag pattern or oblique line pattern, applying a roller having a photoresist material onto the printing plate so as to transfer the predetermined pattern of the printing plate onto the roller, and applying the roller having the transferred predetermined pattern onto a substrate so as to form the contact holes having a pattern corresponding to the transferred predetermined pattern on the roller; and forming pixel electrodes at the unit pixels.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the preferred embodiments of the present invention, with reference to the accompanying drawings.

Figure 1:
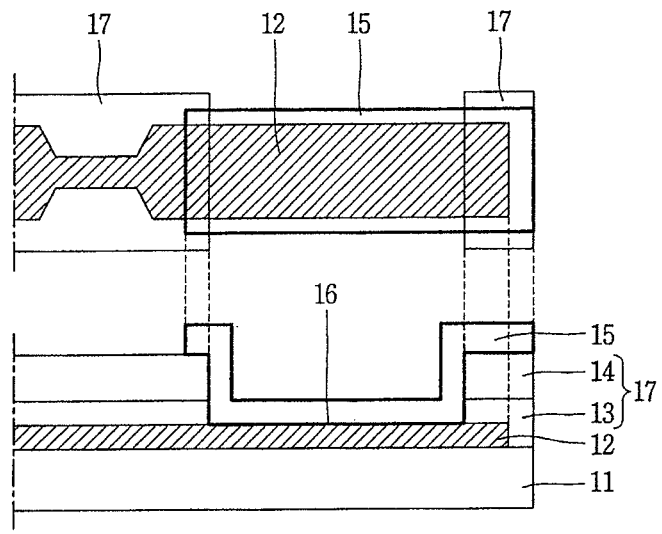
FIG. 1 is a view showing a pad portion of a general LCD device.
Figure 2:
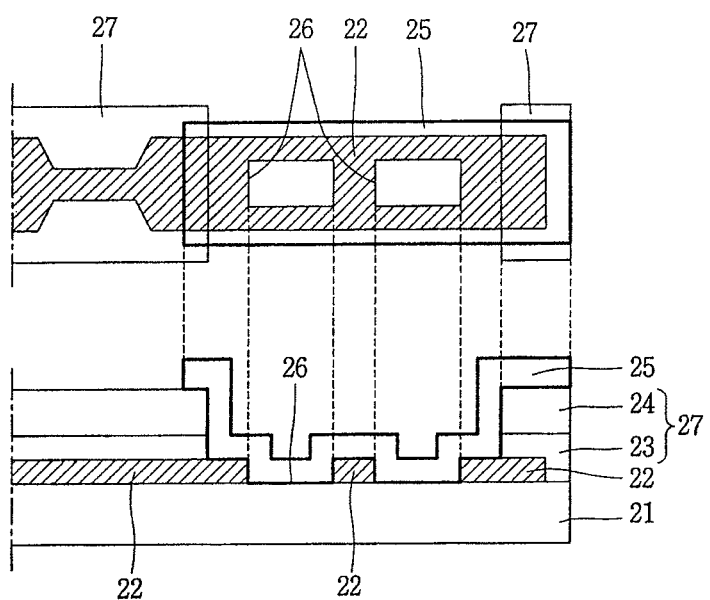
FIG. 2 is a view showing a pad portion of a LCD device having a plurality of pad open regions according to the related art.
Figure 3:
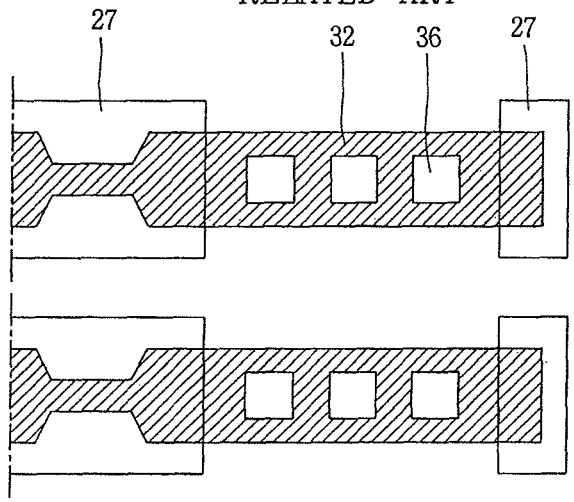
FIG. 3 is a planar view showing pad portions of a LCD device having multi-holes in a stripe format in accordance with the related art.
Figure 4:
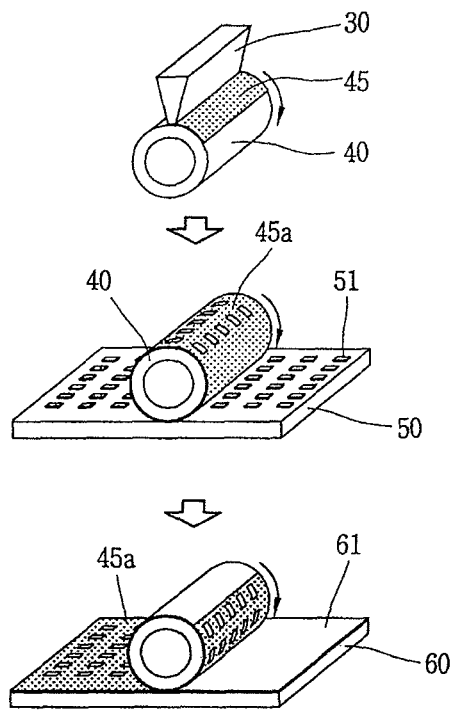
FIG. 4 is a view partially showing a method for fabricating a LCD device to which a related art roll printing method is applied according to the related art.
Figure 5A:
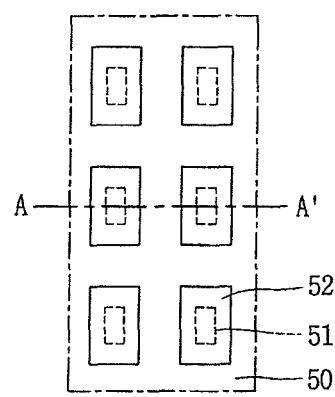
FIG. 5A is a view exemplary showing a structure of a printing plate having embossed patterns in an ideal stripe format in the step of forming mask patterns according to the related art.
Figure 5B:
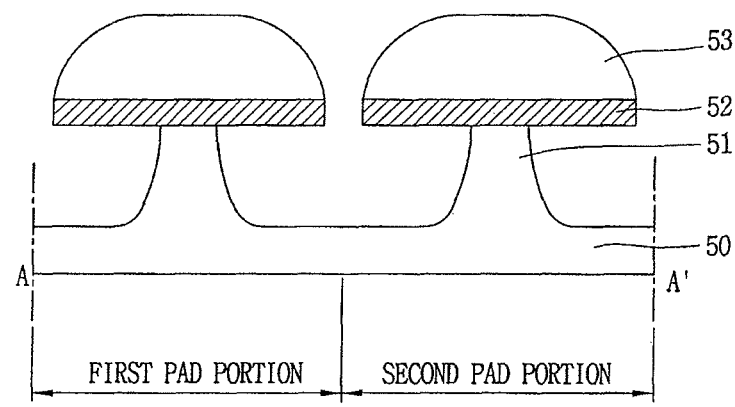
FIG. 5B is a section view showing a cut portion taken along line A-A' in FIG. 5A.
Figure 6A:
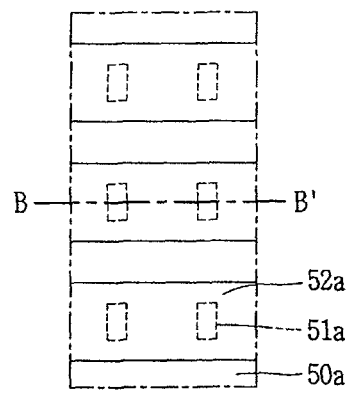
FIG. 6A is a view showing a structure of a printing plate applied to a real process in the step of forming the mask patterns according to the related art.
Figure 6B:
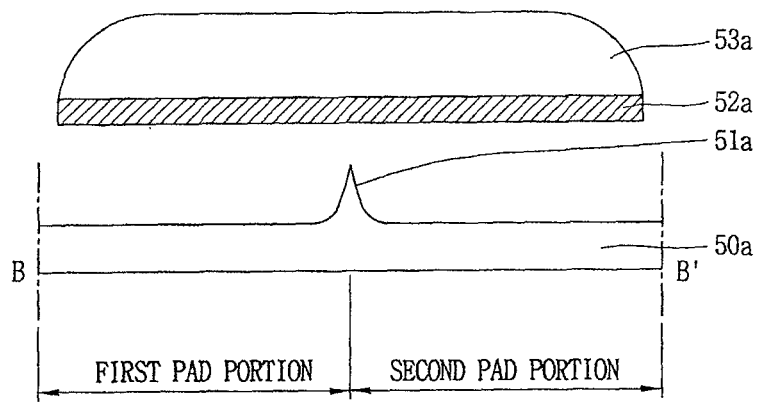
FIG. 6B is a section view showing a cut portion taken along line B-B' in FIG. 6A.
Figure 7A:
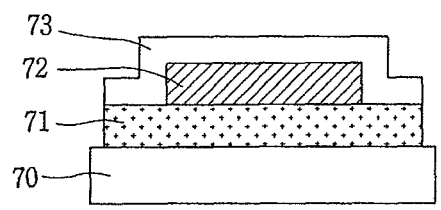
FIGS. 7A to 7C are views showing processes for fabricating a TFT array substrate using a printing plate having the structure shown in FIGS. 6A and 6B according to the related art.
Figure 7B:
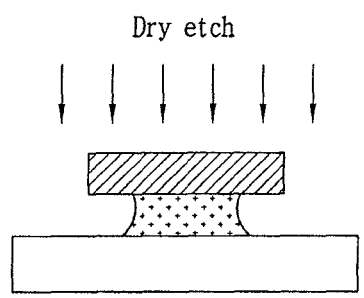
Figure 7C:
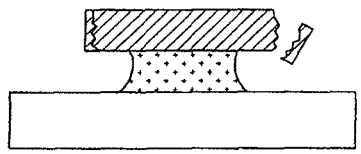
Figure 8A:
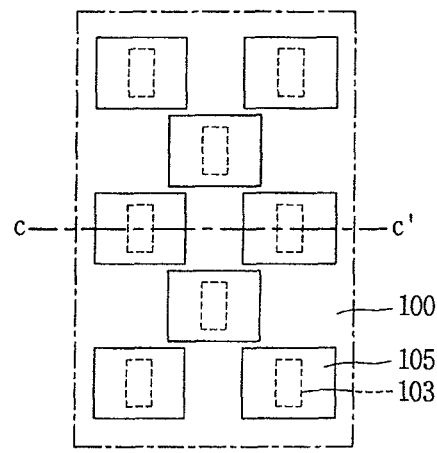
FIG. 8A is a planar view showing a structure of a printing plate used at the time of fabricating a LCD device in accordance with an embodiment of the present invention.
Figure 8B:
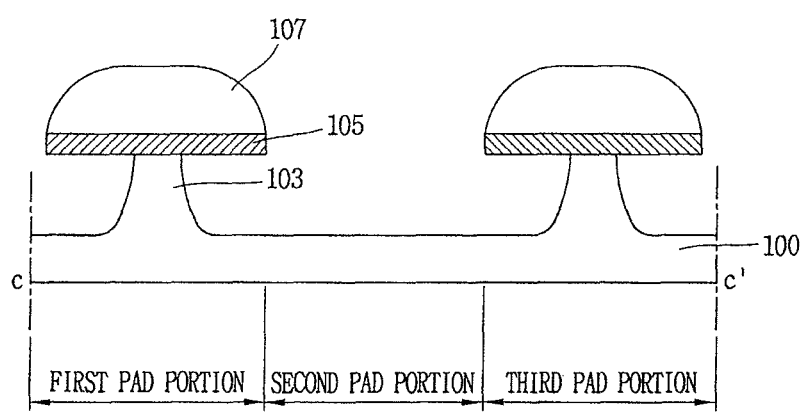
FIG. 8B is a section view showing a cut portion taken along line C-C' in FIG. 8A.

FIG. 8A is a planar view showing a structure of a printing plate applied at the time of fabricating a LCD device in accordance with an embodiment of the present invention, and FIG. 8B is a section view showing a cut portion taken along line C-C' in FIG. 8A.

As shown in FIGS. 8A and 8B, embossed patterns 103 protruded on a glass substrate 100 (or printing plate) are formed in a zigzag (or oblique line) format or configuration. A method for fabricating the printing plate having this structure is discussed below in more detail.

First, a mask layer formed of Mo, Cr, ITO (Indium Tin Oxide), etc. is mounted on the glass substrate 100, i.e., a base substrate.

Next, after coating a photoresist (PR) on the mask layer, a photo mask opened in the zigzag or oblique line format is developed and etched. Accordingly, mask patterns 105 and photoresist patterns 107 formed in the zigzag or oblique line format are formed.

Thereafter, the glass substrate 100 is etched through an etching process using the patterns 105 and 107 and etchant used for forming the mask patterns 105 and the photoresist patterns 107, for example, HydroFluoric acid (HF) based etchant, thus to form the embossed patterns 103 in the zigzag or oblique line format and/or intaglio patterns corresponding to the zigzag or oblique line format of the patterns 105 and 107.

And, the embossed patterns 103 formed on the glass substrate 100 in the zigzag or oblique line format are outwardly exposed by removing the photoresist patterns 107 and the mask patterns 105. As a result, the printing plate 100 having the embossed patterns 103 in the zigzag or oblique line format is formed.

In this case, since an isotropic etching is implemented at the time of etching the glass substrate 100, a mask is designed in consideration of substantially desired embossed patterns 103 and a degree of the isotropic etching at the time of designing the printing plate, thereby forming the photoresist patterns 107 and the mask patterns 105.

And, by forming the mask patterns 105 after mounting the mask layer on the glass substrate 100, it is capable of preventing the etchant from penetrating therebetween since an adhesive force between the photoresist and the mask layer or between the mask layer and the glass substrate 100 is greater than the adhesive force between the photoresist and the glass substrate 100. Accordingly, the present invention allows precise formation of the embossed patterns 103 at the desired positions and thus allows precise and easy formation of contact holes or other structures, formed on the pad portions of a TFT array substrate or other locations.

Furthermore, in the process for fabricating the printing plate using a roll printing process in accordance with an embodiment the present invention, the mask patterns 105 are wider than a width of the embossed patterns 103 and are in the zigzag or oblique line format, and the embossed patterns are used to form the contact holes on gate pad portions and data pad portions having the same pitch according to a photolithography process. This will be determined by the photoresist remaining on the mask patterns 105.

As a result, in the process according to the present invention, for example, when the pitch between data pad portions on the TFT array substrate is 60 μm and an etched depth of the printing plate is 40 μm, it is capable of forming the embossed patterns 103 in consideration of the etched depth of the printing plate when fabricating the printing plate, and thus of obtaining a margin enough to form the contact holes on the TFT array substrate.

And, considering the fabrication cost after fabricating the LCD device, the printing plate having the abovementioned structure can be usefully applied even when the pitch between the gate pad portions or data pad portions becomes shorter.

Meanwhile, regarding the printing plate according to the present invention, the PR solution is transferred by the embossed patterns 103 of the printing plate 100 when a roller coated with the PR solution is rolled on the printing plate 100 on which the embossed patterns 103 are formed, and vice versa according to the properties of the PR solution. That is, the PR solution can be transferred by the intaglio patterns. To this end, the embossed patterns 103 on the glass substrate 100 are formed to have the intaglio patterns.

Figure 9:
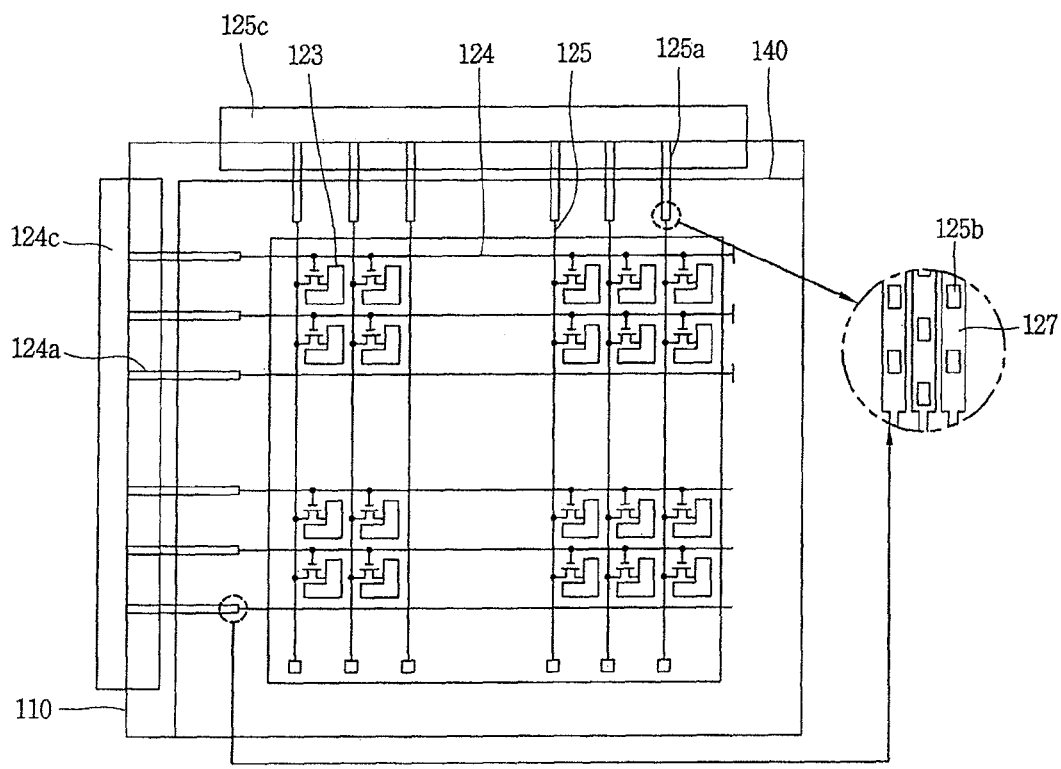
FIG. 9 is a planar view showing a LCD device formed by applying the printing plate of FIGS. 8A and 8B in accordance with a first embodiment of the present invention.

FIG. 9 is a planar view showing a LCD device formed by applying/using the printing plate of FIGS. 8A and 8B in accordance with a first embodiment of the present invention.

As shown in FIG. 9, in a liquid crystal panel that is a basic device forming an LCD device, an upper color filter substrate 140 and a lower TFT array substrate 110 face each other with a specific interval therebetween and liquid crystal including liquid crystal molecules is filled therebetween. Electrodes for applying voltages to the liquid crystal are implemented as a common electrode disposed on the color filter substrate 140 and pixel electrodes 123 disposed on the array substrate 110. When the voltage is applied to two kinds of the electrodes (common and pixel electrodes), a vertical electric field formed by a difference in the applied voltages controls a direction of the liquid crystal modules interposed therebetween.

According to an embodiment, the LCD device at the lower portion of its liquid crystal panel includes a backlight device used as a light source and a driving unit disposed at edge portions of the liquid crystal panel so as to operate the liquid crystal panel. Here, the driving unit is implemented on a PCB (Printed Circuit Board). The PCB is divided into a gate PCB connected to gate lines 124 of the liquid crystal panel and a data PCB connected to data lines 125. Each PCB is connected to TCPs (Tape Carrier Packages) 124c, 125c attached to gate pad portions 124a formed at one lateral surface of the liquid crystal panel and connected to the gate lines 124 and data pad portions 125a connected to data lines 125 formed at an upper side surface perpendicular with the one lateral surface on which the gate pad portions 124a are generally formed.

On the array substrate 110, there are the plurality gate lines 124 and data lines 125 intersecting with each other so as to define unit pixels formed in a matrix format, a TFT formed at an intersecting region of the gate lines 124 and data lines 125, a plurality of gate pad portions 124a and data pad portions 125a formed respectively at end portions of the gate lines 124 and/or data lines 125, contact holes 125b formed in a zigzag (or oblique line) format on the gate pad portions 124a and/or the data pad portions 125a by having two or more pad unit portions as one set (one pad portion), and the pixel electrode 123 formed at each unit pixel of the array substrate 110. That is, each of the gate pad portions 124a and the data pad portions 125a is preferably made up of two or more pad unit portions (unit strips) 127 (each pad unit portion 127 having the contact holes 125b) that are aligned to each other such that all the contact holes of that gate or pad portion as one set form a zigzag or oblique line pattern. In FIG. 9, three pad unit portions 127 are shown to compose one gate or pad portion 124a or 125a.

According to an embodiment, the contact holes 125b formed in the zigzag format on the gate pad portions 124a and the data pad portions 125a respectively formed at the end portions of the gate lines 124 and the data lines 125 are formed through the roll printing process.

As described, in order to perform the roll printing process, mask patterns are formed on the printing plate 100 in a format similar to the gate lines 124 of the array substrate 110 and/or the gate pad portions 124a formed at the end portions of the gate lines 124. Through the printing plate, the contact holes can be formed on the gate pad portions 124a of the array substrate 110 in the zigzag format.

Similarly, through the roll printing method and the printing plate, the contact holes 125b can be formed on the data pad portions 125a formed at the end portions of the data lines 125 in the zigzag format.

For example, a plurality of contact holes 125b are formed with a specific interval therebetween on the gate pad portions 124 and/or the data pad portions 125a. Here, each of the unit pad portions 127 is divided into a first region in which the contact holes 125b are formed and a second region between the contact holes 125b where the contact holes 125b are not formed. In an example, the first and second regions alternate with each other repeatedly in each pad unit portion 127. Further the first region and the second region alternate with each other between adjacent unit pad portions. As a result, the contact holes 125b in all the first regions of each gate/data pad portion are arranged in the zigzag format or oblique line format.

In an example of forming a LCD device, the gate electrodes of the TFTs, the gate lines 124 and the gate pad portions 124a may be simultaneously formed on the same layer on the array substrate 110. And, a gate insulation film is formed on the array substrate 110 on which the gate pad portions 124a is formed, and semiconductor patterns of the TFTs and source/drain electrodes are sequentially formed on the array substrate 110 on which the gate insulation film is formed. And, a protection film is formed on the array substrate 110 on which the source/drain electrodes are formed. Here, the protection film is also formed on the gate insulation film on which the gate pad portion 124a is formed.

Then, the PR patterns are roll-printed using the printing plate as discussed above. Thereafter, through an etching process for forming the contact holes and a stripping process for removing the PR, the contact holes 125b are formed in the zigzag format on the pad portions 124a.

And, a transparent conductive film ITO simultaneously formed at the time of forming the pixel electrodes 123 formed at the unit pixel region is formed at a portion where the contact holes are formed. Each gate pad portion 124a and each data pad portion 125a are electrically connected to an external system through the transparent conductive film ITO, thereby supplying external signals to the gate lines 124 and the data lines 125, respectively.

Here, the external system can be, e.g., a gate TCP (Tate Carrier Package) 124c attached to the gate pad portions 124a and mounting a gate driving IC therein, a data TCP 125c attached to the data pad portions 125a and mounting a data driving IC therein, and a PCB generating all kinds of signals by being connected to the gate TCP 124c and the data TCP 125c.

For example, the TCP 124c mounting the gate driving IC therein and the data TCP 125c mounting the data driving IC therein are attached on the array substrate 110, thus scan signals and picture/date signals are respectively supplied to the gate pad portions 124a and the data pad portion 125a formed on the array substrate 110. And, various circuits such as a common voltage generation circuit are electrically connected to the data TCP 125c. The common voltage generation circuit is connected to a common voltage line of the array substrate 110 thus to apply a common voltage (Vcom).

The roll printing method applied to form the contact holes 125b on the gate pad portions 124a may be equally applied at the time of forming the contact holes 125b in the zigzag format on the data pad portions 125a. In order to perform the roll printing process, mask patterns are formed on the printing plate in a format similar to the data lines 125 of the array substrate 110 and/or the data pad portions 125a formed at the end portions of the data lines 125. Through the printing plate for forming contact holes of the data pad portions 125a, the printing plate on which the mask patterns are formed, the contact holes 125b can be formed on the data pad portions 125a of the array substrate 110 in the zigzag format.

A color filter implementing red (R), green (G) and blue (B) colors corresponding to the pixel electrodes 123 of the array substrate 110 is formed on a color filter substrate 140 bonded by a sealant. And, a common electrode is formed on the color filter with facing the pixel electrodes 123. The color filter substrate 140 includes a black matrix partitioning the color filter. The common voltage (Vcom) is applied to the common electrode through seal patterns formed at and on the common voltage line, thereby generating an electric field with pixel voltages (Vdata) of the R, G and B applied to the pixel electrodes 123.

However, in the LCD device in accordance with the first embodiment of the present invention, it may be desirable to more precisely control the roller at the time of the roll printing process, to avoid a minute mis-alignment. If, for some reason, the PR patterns on the roller for forming the pad contact holes are transferred to edge portions of the gate pad portions and the data pad portions due to the minute mis-alignment, the under cut phenomenon may occur again at the time of etching to form the contact holes. In order to address the abovementioned possible limitation, the present invention provides a second embodiment discussed below.

Figure 10:
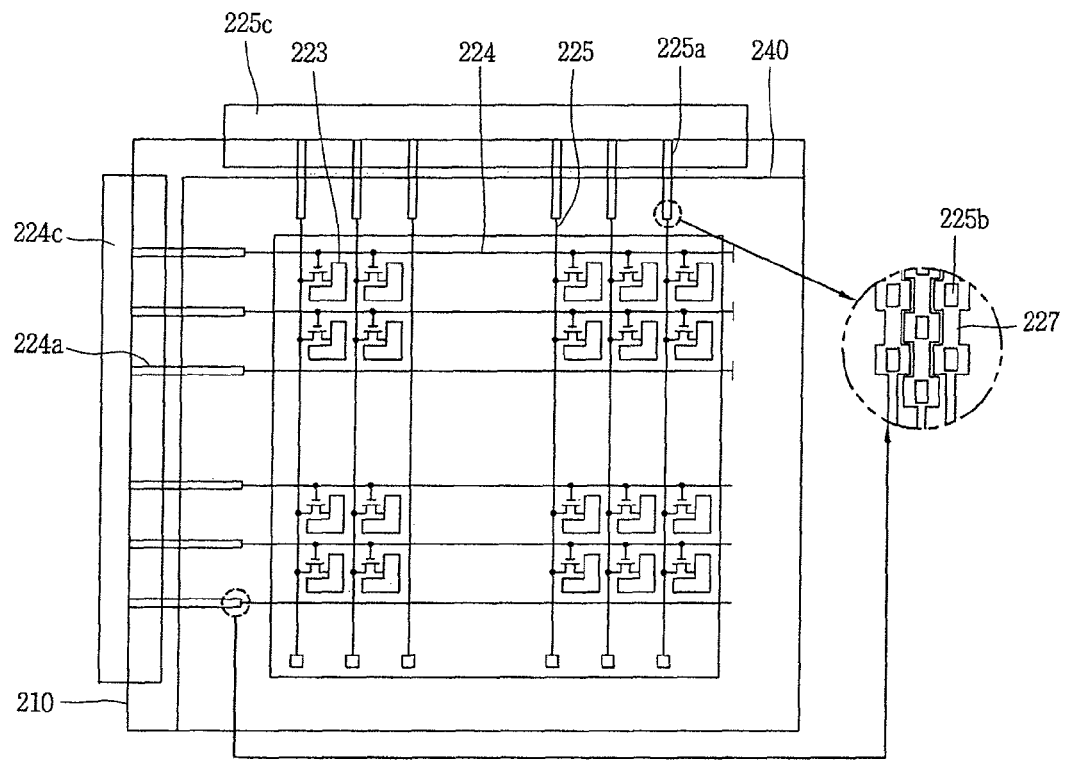
FIG. 10 is a planar view showing a LCD device in accordance with a second embodiment of the present invention.

FIG. 10 is a planar view showing a LCD device in accordance with the second embodiment of the present invention.

As shown in FIG. 10, in a liquid crystal panel that is a basic device forming the LCD device, an upper color filter substrate 240 and a lower TFT array substrate 210 face each other with a specific interval therebetween and liquid crystal including liquid crystal molecules is filled therebetween.

Here, electrodes for applying a voltage to the liquid crystal are implemented as a common electrode disposed on the color filter substrate 240 and pixel electrodes 223 disposed on the array substrate 210. When the voltage is applied to two kinds of the electrodes, a vertical electric field formed by difference in the applied voltages controls a direction of liquid crystal molecules disposed therebetween the substrates 210 and 240.

The LCD device includes a backlight device disposed at the lower portion of the liquid crystal panel and used as a light source and a driving unit disposed at edge portions of the liquid crystal panel to operate the liquid crystal panel. Here, the driving unit is implemented on a PCB (Printed Circuit Board). The PCB is divided into a gate PCB connected to gate lines 224 of the liquid crystal panel and a data PCB connected to data lines 225 of the liquid crystal panel.

Each PCB is connected to TCPs (Tape Carrier Packages) 224c, 225c mounted to gate pad portions 224a formed at one lateral surface of the liquid crystal panel and connected to the gate lines 224, and data pad portions 225a connected to data lines 225 formed at an upper side surface perpendicular with the one lateral surface on which the gate pad portions 224a are formed.

On the array substrate 210, there are a plurality of the gate lines 224 and data lines 225 intersecting with each other so as to define unit pixels formed in a matrix format, TFTs formed at intersecting regions of the gate lines 224 and the data lines 225, a plurality of gate pad portions 224a and data pad portions 225a, contact holes 225b on the gate pad portions 224a and data pad portions 225a, and pixel electrodes 223 each formed at each unit pixel of the substrate. Preferably, each of the gate and data pad portions 224a and 225a is made up of two or more pad unit portions 227 (each pad unit portion having the contact holes 225b) aligned such that all the contact holes 225b on each pad portion 224a or 225a are arranged in the zigzag format or oblique line format. Further, each pad unit portion 227 includes at least one first region and at least one second region alternating with the first region, where each first region includes one contact hole 225b. The linewidth (or also known as width) of the first region including the contact hole 225b is wider than the linewidth of the second region which does not have any contact hole. An example of such structure of the pad unit portions 227 forming each pad portion 224a or 225a is shown in FIG. 10. Further, in FIG. 10, three pad unit portions 227 are shown to compose one gate or pad portion 224a or 225a.

Further, it may be preferably that the contact holes 225b formed in the zigzag format on the gate pad portions 224a and the data pad portions 225a respectively formed at the end portions of the gate lines 224 and the data lines 225 are formed through the roll printing process.

As described, in order to perform the roll printing process, mask patterns are formed on the printing plate in a format similar to the gate lines 224 of the array substrate 210 and/or the gate pad portions 224a formed at the end portions of the gate lines 224. Through the printing plate used for forming contact holes of the gate pad portions 224a, the printing plate on which the mask patterns are formed, the contact holes 225b can be formed on the gate pad portions 224a of the array substrate 210 in the zigzag format.

Through the same or similar roll printing method applied to form the contact holes 225b on the gate pad portions 224a, the contact holes 225b can be formed on the data pad portions 225a formed at the end portions of the data lines 225 in the zigzag format.

In one example, each of the pad unit portions for each of the gate pad portions 224a and the data pad portions 225a is divided into at least one first region having a large linewidth and at least one second region having a small linewidth between the first regions (or next to the first regions). Here, the contact holes 225b are formed on the first region having the large linewidth, and accordingly a plurality of contact holes 225b are formed on every unit pad portion with a constant interval therebetween. Further, since the first region and the second region alternate each other between adjacent unit pad portions and in the same unit pad portion, the contact holes 225b on the first region are viewed to have the zigzag pattern.

In an example of forming a LCD device, the gate electrodes of the TFTs, the gate lines 224 and the gate pad portions 224a may be simultaneously formed on the same layer on the array substrate 210. And, a gate insulation film is formed on the array substrate 210 on which the gate pad portions 224a are formed, and semiconductor patterns of the TFTs and source/drain electrodes are sequentially formed on the array substrate 210 on which the gate insulation film is formed. And, a protection film is formed on the array substrate 210 on which the source/drain electrodes are formed. Here, the protection film is also formed on the gate insulation film on which the gate pad portions 224a are formed.

Then, the PR patterns are roll-printed using the printing plate. Thereafter, through an etching process for forming the contact holes and a stripping process for removing the PR, the contact holes are formed in the zigzag format for each gate and data pad portion as discussed above.

And, a transparent conductive film ITO simultaneously formed at the time of forming the pixel electrodes 223 formed at each unit pixel region is formed at a portion where the contact holes are formed. Each gate pad portion 224a and each data pad portion 225a are electrically connected to an external system through the transparent conductive film ITO, thereby supplying external signals to the gate lines 224 and the data lines 225, respectively.

Here, the external system can be a gate TCP (Tate Carrier Package) 224c attached to the gate pad portions 224a and mounting a gate driving IC therein, a data TCP 225c attached to the data pad portions 225a and mounting a data driving IC therein, and a PCB generating all kinds of signals by being connected to the gate TCP 224c and the data TCP 225c.

That is, the TCP 224c mounting the gate driving IC therein and the data TCP 225c mounting the data driving IC therein are attached on the array substrate 210, thus scan signals and picture signals are respectively supplied to the gate pad portions 224a and the data pad portion 225a formed on the array substrate 210. And, various circuits such as a common voltage generation circuit are electrically connected to the data TCP 225c. The common voltage generation circuit is connected to a common voltage line of the array substrate 210 thus to apply a common voltage (Vcom).

The roll printing method applied to form the contact holes 225b on the gate pad portions 224a may be equally applied at the time of forming the contact holes 225b in the zigzag format on the data pad portions 225a. In order to perform the roll printing process, mask patterns are formed on the printing plate in a format similar to the data lines 225 of the array substrate 210 and/or the data pad portions 225a formed at the end portions of the data lines 225. Through the printing plate for forming contact holes of the data pad portions 225a, the printing plate on which the mask patterns are formed, the contact holes 225b can be formed on the data pad portions 225a of the array substrate 210 in the zigzag format as discussed above.

A color filter implementing red (R), green (G) and blue (B) colors corresponding to the pixel electrodes 223 of the array substrate 210 is formed on a color filter substrate 240 bonded by a sealant. And, a common electrode is formed on the color filter with facing the pixel electrodes 223. The color filter substrate 240 includes a black matrix partitioning the color filter. The common voltage (Vcom) is applied to the common electrode through seal patterns formed at and on the common voltage line, thereby generating an electric field with pixel voltages (Vdata) of the R, G and B applied to the pixel electrodes 223.

Hereafter, each structure of pad portions (gate and/or data pad portions) of LCD devices in accordance with the first embodiment and the second embodiment of the present invention will be explained with reference to the examples of FIGS. 11A to 11C.

Figure 11A:
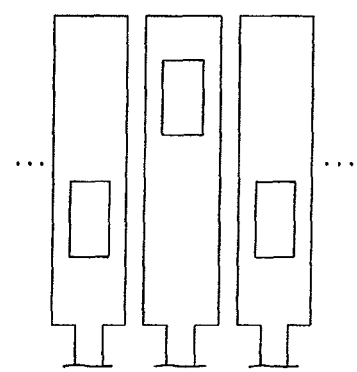
FIGS. 11A to 11C are views showing variations of each structure of pad portions of the LCD devices in accordance with the first and second embodiments of the present invention.
Figure 11B:
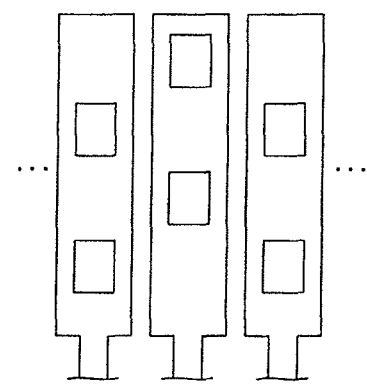
Figure 11C:
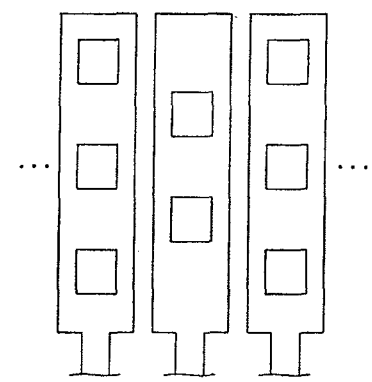

As shown in FIGS. 11A to 11C, according to an example of the present invention, the present invention provides forming the same contact hole or two or more contact holes on every pad portion (or pad unit portion), or forming contact holes different from each other in number on every pad portion (or pad unit portion). An appropriate printing plate having the corresponding patterns may be used.

Here, the contact holes formed on one pad unit portion and the contact holes formed on another pad unit portion adjacent to the one pad unit portion are disposed on different lines. That is, the first region in which the contact holes are formed and the second region in which the contact holes are not formed should be formed to intersect with each other.

Accordingly, it enables the pitch between the pad portions to be smaller at the time of the roll printing process. Accordingly it is capable of reducing the number of the TCP attached on the pad portions, thereby reducing the fabrication cost.

Meanwhile, the contact holes formed in the zigzag format on the pad portions of the LCD devices in accordance with the first and second embodiments of the present invention are not limited to the roll printing process. For example, the formation of contact holes in the zigzag format according to the present invention can be applied to the photolithography process or other suitable processes.

In addition, in order to reduce the fabrication cost at the time of fabricating the LCD device, the present invention reduces the number of TCPs attached onto the pad portions of the TFT array substrate. That is, in order to reduce the number of TCPs, the interval between the gate pad portions and the data pad portions is preferably shortened.

Here, when the interval between the pad portions shortened, the coupling force between the photoresist coated at a space between the pad portions and the gate insulation film or protection film is relatively weakened, thereby generating a peeling phenomenon causing even the photoresist to be peeled away at the time of developing process for forming the contact holes.

According to the present invention, a contact area between the photoresist and the gate insulation film or protection film is large. Accordingly it is capable of performing even the photolithography process by designing the mask which allows to form the contact holes in the zigzag format on the TFT array substrate or other suitable substrate.

Accordingly, the present invention prevents a part of the metallic film at edge portions forming the pad portions in the rubbing process from being come away at the time of forming the contact holes on the gate and data pad portions of the LCD device using the roll printing process. Accordingly inferior panels caused by foreign substances during the cell process can be reduced, thereby increasing a yield of the product.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
   a plurality of gate lines and data lines arranged on a substrate to define a plurality of unit pixels;
   thin film transistors (TFTs) each formed at an intersecting region of the gate lines and the data lines;
   a plurality of gate pad portions and data pad portions formed at end portions of the gate lines and the data lines, respectively, at least one of the gate and data pad portions being made up of at least two pad unit portions, each pad unit portion having at least one contact hole such that the contact holes of one of the plurality of gate or data pad portions are arranged in a zigzag or an oblique line format; and
   pixel electrodes formed at the unit pixels.

2. The LCD device of claim 1, wherein each of the at least two pad unit portions includes at least one first region having at least one contact hole, and at least one second region adjacent to the at least one first region and excluding any contact hole.

3. The LCD device of claim 1, wherein each of the at least two pad unit portions has a uniform linewidth throughout that pad unit portion.

4. The LCD device of claim 3, wherein all of the at least two pad unit portions have the same linewidth.

5. The LCD device of claim 3, wherein each of the at least two pad unit portions has a single contact hole, and no two adjacent contact holes are aligned to each other.

6. The LCD device of claim 3, wherein a number of contact holes present in each of the at least two pad unit portions vary.

7. The LCD device of claim 1, wherein each pad unit portion has a varying linewidth throughout that pad unit portion.

8. The LCD device of claim 1, wherein each of the at least two pad unit portions has at least one first region having a contact hole and a first linewidth, and at least one second region excluding a contact hole and a second linewidth less than the first linewidth.

9. The LCD device of claim 8, wherein each of the at least two pad unit portions has a pair of protrusions at opposite sides of that pad unit portion.

10. The LCD device of claim 9, wherein each of the at least two pad unit portions has a plurality of pairs of the protrusions disposed at regular intervals.

11. The LCD device of claim 10, wherein the plurality of pairs of protrusions of the at least one of the gate and pad portions form a zigzag pattern or oblique lines.

* * * * *